United States Patent
Perrott

(10) Patent No.: US 7,946,442 B2
(45) Date of Patent: May 24, 2011

(54) CLASP

(75) Inventor: Chad A. Perrott, Woodstock, IL (US)

(73) Assignee: UOP LLC, Des Plaines, IL (US)

( * ) Notice: Subject to any disclaimer, the term of this patent is extended or adjusted under 35 U.S.C. 154(b) by 314 days.

(21) Appl. No.: 12/179,566

(22) Filed: Jul. 24, 2008

(65) Prior Publication Data
US 2010/0018010 A1    Jan. 28, 2010

(51) Int. Cl.
B65D 45/16    (2006.01)
(52) U.S. Cl. ............. 220/324; 220/326; 24/455
(58) Field of Classification Search ............ 220/324, 220/326; 24/455
See application file for complete search history.

(56) References Cited

U.S. PATENT DOCUMENTS

| | | | |
|---|---|---|---|
| 3,602,253 A | 8/1971 | Bahout et al. | |
| 4,255,363 A | 3/1981 | Geiger et al. | |
| 4,536,373 A | 8/1985 | Jones, Jr. | |
| 6,267,359 B1 | 7/2001 | Stippick | |
| 6,592,106 B1 | 7/2003 | Eaton, Jr. | |
| 6,884,325 B1 * | 4/2005 | Mabry et al. | 202/242 |
| 7,048,464 B2 * | 5/2006 | Ronnquist | 403/321 |
| 7,155,801 B2 | 1/2007 | Hammon et al. | |
| 7,234,692 B2 | 6/2007 | Dichtl et al. | |
| 7,347,413 B2 | 3/2008 | Diefenbacher et al. | |
| 2005/0139599 A1 * | 6/2005 | Schainholz et al. | 220/324 |

FOREIGN PATENT DOCUMENTS

| | | |
|---|---|---|
| GB | 1292037 | 10/1972 |
| GB | 1363118 | 8/1974 |

* cited by examiner

Primary Examiner — Anthony Stashick
Assistant Examiner — Madison L Wright
(74) Attorney, Agent, or Firm — James C Paschall

(57) ABSTRACT

One exemplary embodiment can be a clasp for securing a man-way cover in a vessel. The clasp can include a hinged member. Generally, the hinged member has a first position for securing the man-way cover and a second position for unsecuring the man-way cover.

12 Claims, 3 Drawing Sheets

CLASP

FIELD OF THE INVENTION

This invention generally relates to a clasp, which may be particularly suited to secure a cover in a vessel.

DESCRIPTION OF THE RELATED ART

Processing vessels can be employed in a variety of industries, such as food, pharmaceutical, chemical, refinery, or petrochemical processing. Generally, such vessels can include reactors, distillation columns, and absorbers. Often, such vessels can have external man-ways for allowing access to the internal components. Moreover, such vessels can also include internal man-ways for accessing various structures within the vessel.

Generally, the internal man-ways can be situated on a tray for accessing, for example, one or more catalyst beds located below the tray. Typically, a tray forms a hole creating the man-way, which can be covered by a plate or cover. Usually, the cover is secured with several nuts and bolts around its periphery.

Unfortunately, using nuts and bolts can present several disadvantages. The nuts attached to the bolts can be subject to excessive torque. Excessive torque can result in rounding off the nuts and/or stripping the bolt threads rendering the combination useless. Moreover, galling can occur due to hydrocarbon processing which, optionally in conjunction with excessive torque, may result in certain points of the nuts and bolts becoming welded together. If excessive galling occurs, the nut may not unscrew from the bolt.

Due to these problems, the cutting of a bolt may be required for removing the combination and opening the man-way cover. However, this solution can create unnecessary delays. In addition, the man-way cover is often difficult to access due to other equipment inside of the vessel. Consequently, this can further exasperate the difficulty of cutting and removing the bolts to open the cover.

Several solutions have been attempted to overcome such deficiencies, such as utilizing different metals for the nut and bolt to prevent galling. Regrettably, even if such metals are successful in preventing galling, there is still the risk of excessive torque despite extensive time and training provided to operation personnel to prevent such occurrences. Consequently, there is a desire for a clasp that overcomes these shortcomings.

SUMMARY OF THE INVENTION

One exemplary embodiment can be a clasp for securing a man-way cover in a vessel. The clasp can include a hinged member. Generally, the hinged member has a first position for securing the man-way cover and a second position for unsecuring the man-way cover.

Another exemplary embodiment can be an internal structure for a vessel. The internal structure can include a first member at least partially bordering an opening, a second member covering the opening, and a clasp. Generally, the clasp includes a hinged member. The hinged member may have a first position for securing the second member, and a second position for unsecuring the second member.

A further exemplary embodiment can be a vessel. The vessel can include an enclosure defining an interior volume and at least one internal structure. The internal structure may include a first member at least partially bordering an opening, a second member covering the opening, and a clasp. Generally, the clasp includes a hinged member. Typically, the hinged member can have a first position for securing the second member, and a second position for unsecuring the second member.

The clasp as disclosed herein can provide a suitable mechanism for securing a man-way cover within a vessel without the use of bolts and nuts, which have the deficiencies as described above. As such, the embodiment disclosed herein will facilitate the removal of such man-way covers during a downtime for, e.g., maintenance or equipment refurbishing, generally without the use of tools such as wrenches. Particularly, during downtimes it is usually advantageous to proceed quickly due to the desire to restart the unit.

DEFINITIONS

As used herein, the term "coupled" can mean two items, directly or indirectly, joined, fastened, associated, connected, or formed integrally together either by chemical or mechanical means, by processes including stamping, molding, or welding. What is more, two items can be coupled by the use of a third component such as a mechanical fastener, e.g. a screw, a nail, a staple, or a rivet; an adhesive; or a solder.

As used herein, the term "covering" can mean partially or entirely covering an opening, such as a man-way.

DETAILED DESCRIPTION

Figure 1:
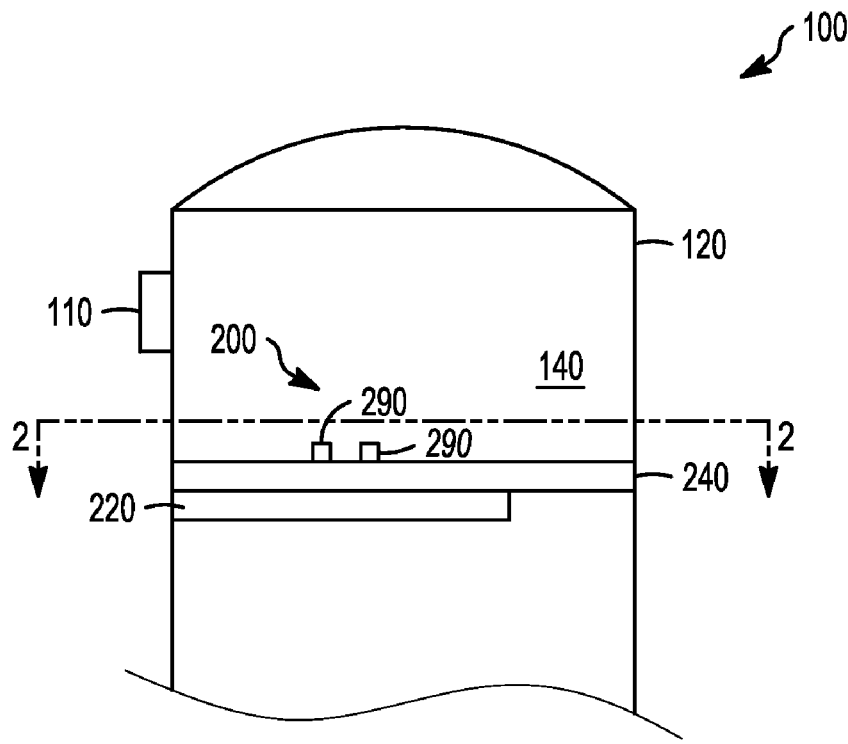
FIG. 1 is a schematic cross-section of a portion of an exemplary vessel.
Figure 2:
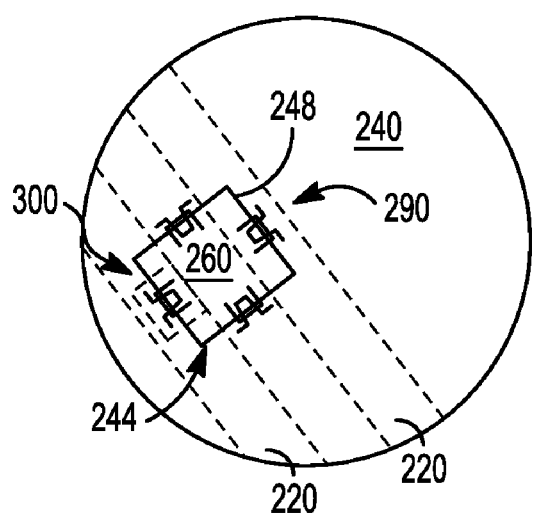
FIG. 2 is a top, plan view along line 2-2 of FIG. 1 of an exemplary tray.

Referring to FIGS. 1-2, a portion of an exemplary vessel 100 is depicted. The vessel 100 can be any type of processing vessel, such as a reactor, a distillation column, an absorber, or a stripper. Generally, such a vessel 100 can facilitate mass transfer operations in any flow orientation, such as downflow, upflow, co-current flow, and counter-current flow for one or more fluids, such as a gas, a liquid, or a mixed-phase of liquid and gas. Often, the vessel 100 can include one or more vapor and/or liquid mixing, contacting, collecting, and/or redistributing trays.

The vessel 100 can include an external man-way 110 allowing access to an enclosure 120 defining an interior volume 140 and containing at least one internal structure 200. In this exemplary embodiment, the vessel 100 can be a reactor 100 having the at least one internal structure 200, namely a first member 240, such as a tray 240, above, for example, a packed bed of catalyst. Although one tray 240 is depicted, it should be understood that any number of trays may be included. The tray 240 can include other structures, such as bubble caps, tray valves, downcorners, and weirs to facilitate desired operations. The external man-way 110 can be any suitable shape, and typically can be circular, hexagonal, or octagonal. Generally, the external man-way 110 can be secured with a cover that is attached by a series of bolts and nuts around its perimeter. Removing the bolts and nuts can allow access to the interior volume 140.

Referring to FIG. 2, the tray 240 can form an opening 244, which is typically a man-way 244. Although in this preferred embodiment the tray 240 surrounds the man-way 244, it should be understood that the man-way 244 can be at least partially or entirely be formed by the wall of the vessel 100 or other structure, and have its shape at least partially or entirely defined thereby. Usually, the tray 240 can at least partially or completely border the man-way 244. The man-way 244 can be covered by a second member 260, which is typically a man-way cover 260. Generally, the man-way 244 can be any suitable shape, such as a hexagon, a circle, a parallelogram, a rhombus, or other polygon shape. The man-way cover 260 can have a shape corresponding to that of the man-way 244. As such, the man-way cover 260 can also be any corresponding suitable shape, such as a hexagon, a circle, a parallelogram, a rhombus, or other polygon shape. Generally, the man-way cover 260 can rest on one or more beams 220 (depicted in phantom) underneath the tray 240. The man-way cover 260 can include a perimeter 248. About the perimeter 248, a plurality of clasps 290, including a clasp 300, can secure the man-way cover 260 during, e.g., hydrocarbon processing. Although four clasps 290 are depicted, it should be understood that any number of clasps 290 may be used to secure the man-way cover 260 to the tray 240.

As depicted in FIG. 2, a rectangular section is shown around the clasp 300 with dashed lines. This cut-away section is depicted in more detail in FIGS. 3-5 and is used for illustrative purposes only.

Figure 3:
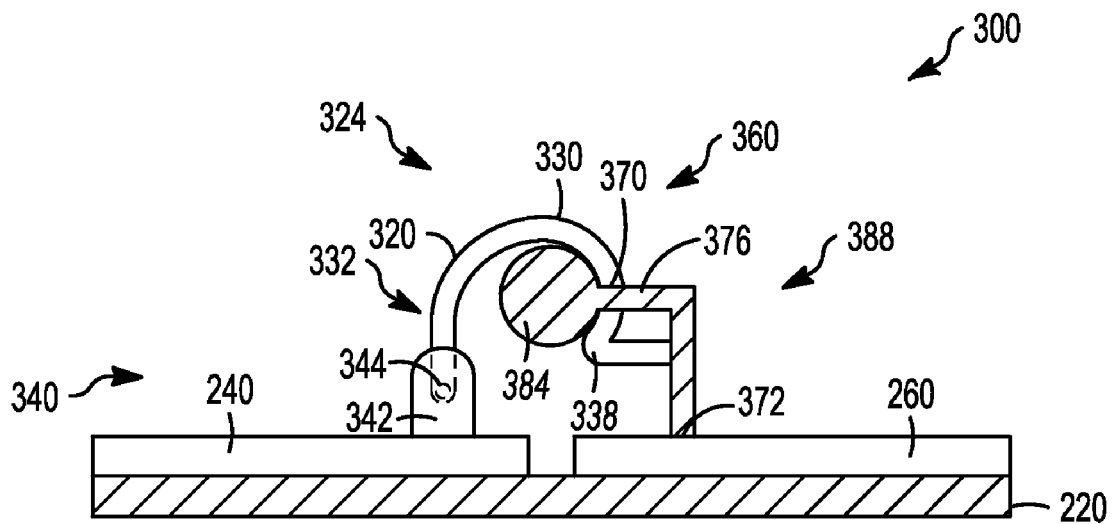
FIG. 3 is an elevational, side view of an exemplary clasp in a first position.
Figure 4:
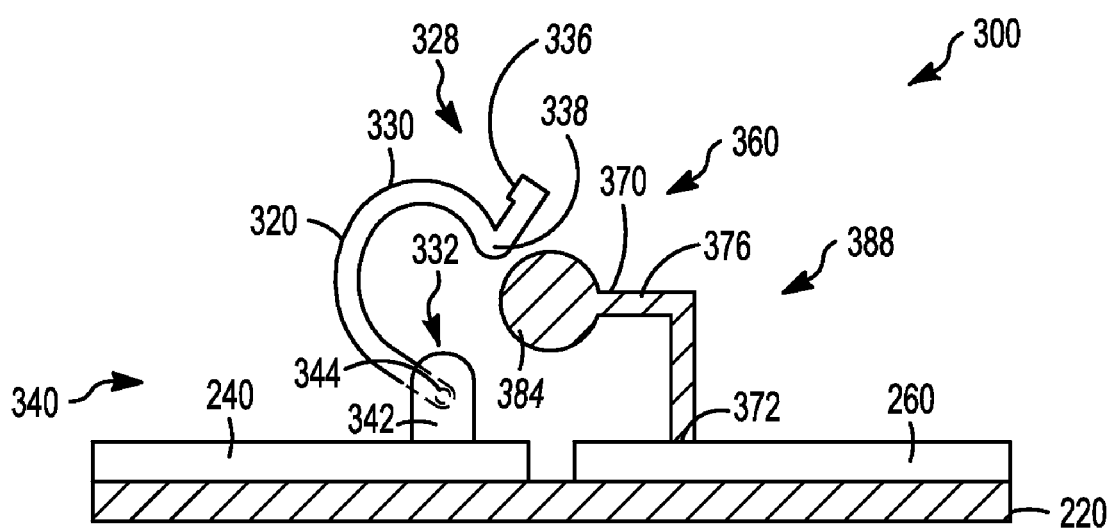
FIG. 4 is another elevational, side view of the exemplary clasp in a second position.
Figure 5:
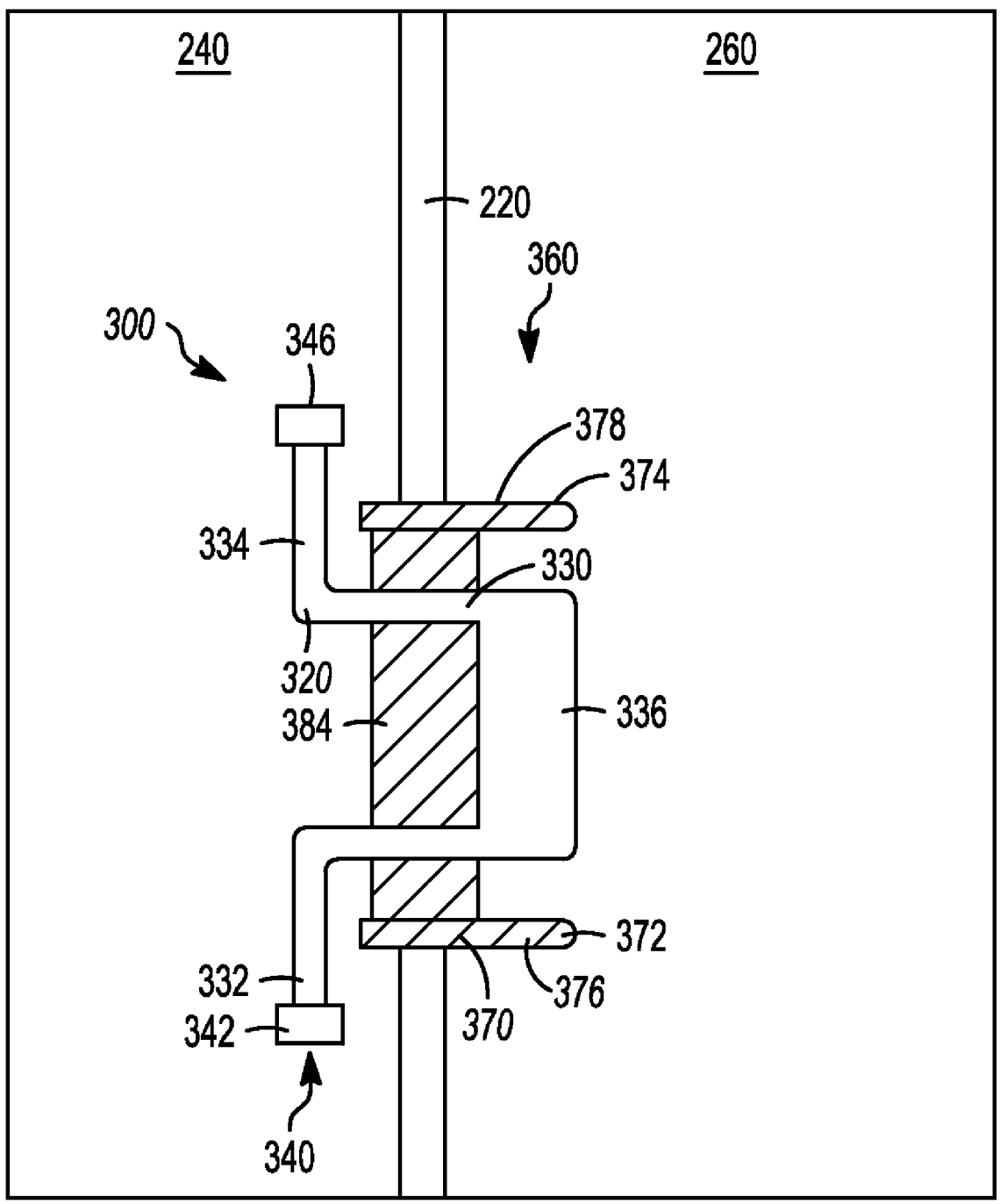
FIG. 5 is a top, plan view of the exemplary clasp.

Referring to FIGS. 3-5, the exemplary clasp 300 can include a hinged member 320 and a catch 360. The catch 360 is depicted with cross-hatching for illustrative purposes only for distinguishing the catch 360 from the hinged member 320. The hinged member 320 can have a first position 324 securing the man-way cover 260 as depicted in FIG. 3, and a second position 328 unsecuring the man-way cover 260 as depicted in FIG. 4, which permits removal of the man-way cover 260.

The hinged member 320 can include a loop 330 having a first end 332 and a second end 334. The loop 330 can form a grip 336 and a lip 338. The grip 336 can be accessible and graspable by a hand to manipulate the hinged member 320. The loop 330 can be resilient with the lip 338 particularly flexible to snap and lock the hinged member 320 about the catch 360. A plurality of posts 340 can be formed integrally with the tray 240. The plurality of posts 340 can include a first post 342 and a second post 346. Although only the first post 342 is depicted with a first aperture 344, it should be understood that the first post 342 and the second post 346 can each form a respective aperture for receiving, respectively, the first end 332 and the second end 334 of the loop 330. Desirably, the hinged member 320 is coupled to the tray 240.

The catch 360 can include a loop 370 having a first end 372 and a second end 374 formed integrally with the man-way cover 260. Generally, each end 372 and 374 rising upward is coupled, preferably formed integrally with, a respective first horizontal arm 376 and a second horizontal arm 378 at an angle of about 90°, as viewed from the side. The horizontal arms 376 and 378 can couple a bulbous ridge 384, which is preferably cylindrically shaped. What is more, the first end 372 and the second end 374 can be of sufficient height 388 to provide a handgrip beneath the bulbous ridge 384. Particularly, the catch 360 can provide a handgrip once the hinged member 320 is unsecured. Although in this exemplary embodiment the hinged member 320 is coupled to the tray 240 and the catch 360 is coupled to the man-way cover 260, it should be understood that the catch 360 can be coupled to the tray 240 and the hinged member 320 can be coupled to the man-way cover 260. Also, it should be understood that the man-way cover 260 can be secured to other structures inside the vessel 100 other than the tray 240, such as the one or more supports 220.

Referring to FIG. 4, to secure the man-way cover 260, the hinged member 320 can be pivoted about the posts 342 and 346 downward to press the lip 338 against the upper portion of the bulbous ridge 384. Additional pressure can flex the lip 338 outward so the main part of the loop 330 engages the bulbous ridge 384. The lip 338 can snap backwards about the lower portion of the bulbous ridge 384 to close the clasp 300 and secure the man-way cover 260, as depicted in FIG. 3.

Referring to FIG. 3, to unsecure the man-way cover 260, the grip 336 can be grasped, for example, by a hand to rotate the loop 330 upwards and backwards. The lip 338 can extend outward along the periphery of the bulbous ridge 384 freeing the loop 320 and snaps back once the loop 320 has cleared the bulbous ridge 384. Thus, the man-way cover 260 can be unsecured.

The clasp 300 can be fashioned from any suitable material, and one preferred material is a metal or a metal alloy. The material can be titanium, carbon steel, or stainless steel. Particularly suitable stainless steels can be AISI designations 304, 316, 347, or 410 stainless steel, alloy 20 with AISI designation A555-79, and a stainless steel alloy sold under the trade name Monel by Inco Alloys International, Inc. of Huntington, W.Va. Typically, the clasp 300 can be fashioned from such a metal alloy in the form of a wire, particularly the hinged member 320, which can have a diameter of about 0.6-about 2 cm. To obtain a good correspondence between the hinged member 320 and the bulbous ridge 384, the loop 330 can be hot or cold bended about the bulbous ridge 384 during manufacture. In addition to allow for variance in the vessel 100 manufacture, it is desirable to fashion the grip 336 with a length generally less than the distance between the first end 372 and the second end 374, as depicted in FIG. 5. Fashioning the clasp 300 from these materials and in this manner can permit the construction of a clasp 300 having sufficient resilience and tolerance.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A processing vessel defining an interior volume containing an internal structure comprising:
   A) a first member contained in the interior volume of the processing vessel, the first member at least partially bordering an opening in the first member;
   B) a second member covering the opening; and
   C) a clasp, wherein the clasp comprises:
      1) a hinged member having:
         a) a first position for securing the second member; and
         b) a second position for unsecuring the second member.

2. The processing vessel according to claim 1, wherein the hinged member comprises a loop wherein the loop comprises first and second ends coupling a grip there-between.

3. The processing vessel according to claim 2, wherein the clasp further comprises first and second posts wherein each post forms an aperture for receiving a respective end of the loop.

4. The processing vessel according to claim 3, wherein each post is coupled to the first member.

5. The processing vessel according to claim 2, wherein the loop of the hinged member further forms a lip.

6. The processing vessel according to claim 1, wherein the clasp further comprises a catch.

7. The processing vessel according to claim 6, wherein the catch forms a loop.

8. The processing vessel according to claim 1, wherein the first member comprises a tray and the second member comprises a man-way cover.

9. The processing vessel according to claim 8, wherein the hinged member is coupled to the tray and a catch is coupled to the man-way cover.

10. A vessel, comprising:
I) an enclosure defining an interior volume;
II) at least one internal structure contained in the interior volume comprising:
 A) a first member at least partially bordering an opening;
 B) a second member covering the opening; and
 C) a clasp, wherein the clasp comprises:
  1) a hinged member having:
   a) a first position for securing the second member; and
   b) a second position for unsecuring the second member.

11. The vessel according to claim 10, further comprising a plurality of clasps positioned about a perimeter of the opening.

12. The vessel according to claim 10, wherein the clasp comprises stainless steel, carbon steel, or titanium, and the hinged member has a diameter of about 0.6-about 2.0 cm.

* * * * *